US 8,055,707 B2

(12) United States Patent
Desai et al.

(10) Patent No.: US 8,055,707 B2
(45) Date of Patent: Nov. 8, 2011

(54) CALENDAR INTERFACE FOR DIGITAL COMMUNICATIONS

(75) Inventors: Snehal Desai, Richardson, TX (US); Jack Jachner, Plano, TX (US); Atiya Suhail, Plano, TX (US); Kashipati G. Rao, Plano, TX (US)

(73) Assignee: Alcatel Lucent, Paris (FR)

( * ) Notice: Subject to any disclaimer, the term of this patent is extended or adjusted under 35 U.S.C. 154(b) by 606 days.

(21) Appl. No.: 11/290,164

(22) Filed: Nov. 30, 2005

(65) Prior Publication Data
US 2007/0124371 A1 May 31, 2007

(51) Int. Cl.
 G06F 15/16 (2006.01)
(52) U.S. Cl. ....................................................... 709/204
(58) Field of Classification Search ................... 709/204
 See application file for complete search history.

(56) References Cited

U.S. PATENT DOCUMENTS

| | | | |
|---|---|---|---|
| 5,479,408 A * | 12/1995 | Will | 370/313 |
| 6,731,732 B2 | 5/2004 | Creamer | |
| 7,441,194 B2 | 10/2008 | Vronay et al. | |
| 7,496,500 B2 | 2/2009 | Reed et al. | |
| 2002/0023132 A1 * | 2/2002 | Tornabene et al. | 709/205 |
| 2002/0062346 A1 * | 5/2002 | Chen | 709/204 |
| 2002/0065110 A1 * | 5/2002 | Enns et al. | 455/566 |
| 2002/0069247 A1 * | 6/2002 | Paknad et al. | 709/204 |
| 2002/0178228 A1 * | 11/2002 | Goldberg | 709/206 |
| 2003/0006919 A1 * | 1/2003 | Collins et al. | 341/87 |
| 2003/0009595 A1 * | 1/2003 | Collins | 709/247 |
| 2003/0014477 A1 * | 1/2003 | Oppenheimer et al. | 709/203 |
| 2003/0018724 A1 * | 1/2003 | Mathewson et al. | 709/206 |
| 2003/0018726 A1 * | 1/2003 | Low et al. | 709/206 |
| 2003/0063732 A1 | 4/2003 | Mcknight | |
| 2003/0106022 A1 * | 6/2003 | Goodacre et al. | 715/513 |
| 2003/0117365 A1 * | 6/2003 | Shteyn | 345/156 |
| 2003/0130953 A1 * | 7/2003 | Narasimhan et al. | 705/59 |
| 2003/0156138 A1 * | 8/2003 | Vronay et al. | 345/772 |
| 2003/0195937 A1 * | 10/2003 | Kircher et al. | 709/207 |
| 2004/0170263 A1 * | 9/2004 | Michael et al. | 379/201.1 |
| 2004/0243677 A1 * | 12/2004 | Curbow et al. | 709/206 |
| 2005/0076037 A1 * | 4/2005 | Shen | 707/100 |

FOREIGN PATENT DOCUMENTS

| | | | |
|---|---|---|---|
| EP | 11109121 | * | 6/2001 |
| EP | 1727338 A2 | | 11/2006 |
| WO | WO 2004/056137 A1 | | 7/2004 |
| WO | WO 2004/095206 A2 | | 11/2004 |

OTHER PUBLICATIONS

"A method for adding events into a calendar automatically," IBM technical Disclosure Bulletin, Dec. 2001, UK NNRD452115.*
Jackson et al. SEXY: The stanford Event extraction sYstem Dec. 2003, pp. 1-15.*

(Continued)

Primary Examiner — Larry Donaghue
(74) Attorney, Agent, or Firm — Garlick Harrison & Markison

(57) ABSTRACT

Information from communications is displayed in a calendar format. Text from the communications is used to determine whether a scheduling entry should be created. If so, text from the communication is used to create a proposed calendar or to-do list entry, which can be saved, modified or canceled by the user. Information from a call log can be filtered and displayed in a calendar format.

13 Claims, 7 Drawing Sheets

OTHER PUBLICATIONS

Black et al. Automated Event extraction from Email, 2004, pp. 1-12.*
Corston-Oliver Intergration of Email and Task Lists 2004 pp. 1-2.*
Dalli Automated Email intergration with Personal Information Management Applications 2004 pp. 1-3.*
Tsuda, et al.; WorkWare: WWW-based Chronological Document Organizer; 3rd Asia Pacific Computer Human Interaction Proceedings; Jul. 15-17, 1998; pp. 380-385.
Muller, et al.; Visualization Methods for Time-Dependent Data—an Overview; Proceedings of the 2003 Winter Simulation Conference; Dec. 7-10, 2003; pp. 737-745; vol. 1.
Microsoft Outlook '97 Get Organized; Internet Citation; May 30, 2001 Retrieved from the Internet: www.microsoft.com/office/previous/outlook/97brch/organized.asp (retrieved Oct. 15, 2004).

* cited by examiner

November 2004

| S | M | T | W | T | F | S | Buddies |
|---|---|---|---|---|---|---|---|
|   | 1 | 2 | 3 | 4 | 5 | 6 | OTUC |
|   |   |   |   |   |   |   | Emmanuel |
|   |   |   |   |   |   |   | Patrick |
| 7 | 8 | 9 | 10 | 11 | 12 | 13 | Jason |
|   |   |   |   |   |   |   | Jack |
| 14 | 15 | 16 | 17 | 18 | 19 | 20 | Mike |
| 21 | 22 | 23 | 24 | 25 | 26 | 27 |  |
| 28 | 29 | 30 |   |   |   |   |  |

| All Comm |
|---|
| Call Log |
| IM Log |
| Missed Calls |
| E-mail Log |

*Fig. 3b*

November 2004 — Jason (Missed Calls)

| S | M | T | W | T | F | S | Buddies |
|---|---|---|---|---|---|---|---|
|   | 1 | Good game 2 | 3 | 4 | Meeting tomorrow 5 | 6 |  |
| 7 | Can't make it 8 | 9 | 10 | Purchase Reqs 11 | 12 | 13 |  |
| 14 | 15 | 16 | Purchase Reqs 17 | 18 | 19 | 20 |  |
| 21 | 22 | Purchase Reqs 23 | 24 | 25 | 26 | 27 |  |
| 28 | 29 | 30 |   |   |   |   |  |

*Fig. 3c*

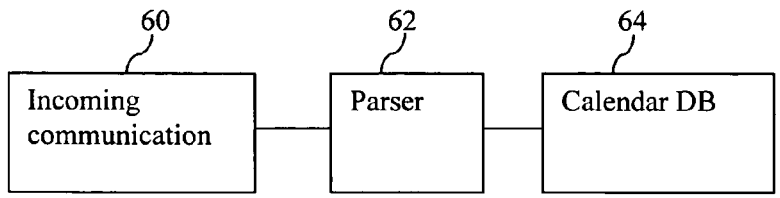
*Fig. 6*
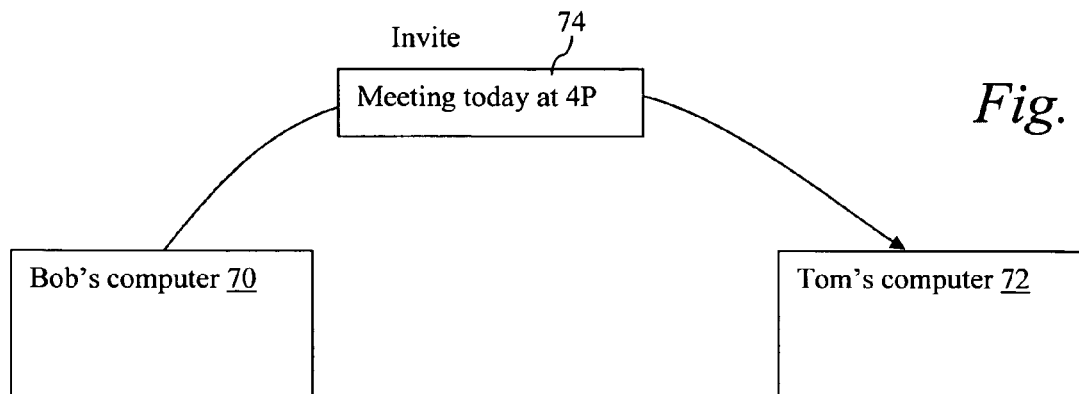
*Fig. 7*
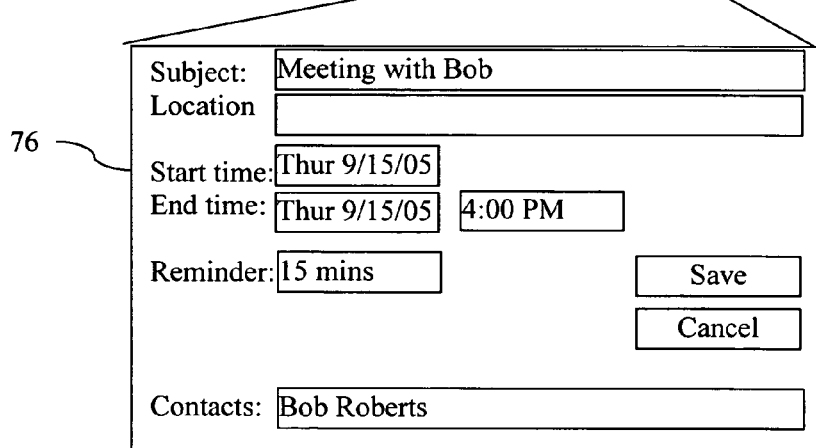

CALENDAR INTERFACE FOR DIGITAL COMMUNICATIONS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to electronic communications and, more particularly, to a calendar interface to multiple communication streams.

2. Description of the Related Art

For many years, the vast majority of communications were either voice communications over the telephone or written communications sent by mail. Over the last decade, the options for communication have increased dramatically. Now, telephonic communications are provided not only by wireline connections, but also through wireless telephone and IP (Internet protocol) telephones, also referred to as packet phones or VOIP (voice over IP) telephones, which communicate over a network, such as the Internet. IP telephones include, for example, standalone dedicated units, ATAs (analog telephone adapters, which perform the necessary translation to adapt a standard analog phone for VOIP communications), and "soft" phones that are executed on a computing device, such as a computer or personal digital assistant (PDA). In addition, electronic mail (email) and instant messaging has largely replaced mail as the main form of written communication. In addition to written communications, messaging applications often provide voice and visual communication between two or more parties. A single computer could be simultaneously executing an email application, a VOIP telephone application, and multiple instant messaging windows (or a single application that unifies multiple communication types).

Accordingly, a person may be receiving information from a number of sources—cell phone, wireline phone, IP phone, email and instant messaging. This can result in a data overload, making it difficult for a user to organize the information and to docket events based on the information.

Therefore, a need has arisen for an improved method and apparatus for interfacing with various digital communication sources.

BRIEF SUMMARY OF THE INVENTION

In a first embodiment, the present invention provides for organizing data associated with communications. An electronic database including information regarding communication interactions between a user and other parties is maintained, wherein the database includes a date for each communication interaction. A user processing device displays all or a selected portion of the communication interactions in a calendar format according to said date.

This aspect of the invention provides a superior interface for displaying information regarding communication interactions, such as received calls, missed calls, placed calls, email messages, text/instant messages and so on. The displayed information may be filtered to provide more insight as to the nature of various communications. The filters provide the additional advantage of downloading only specific communication log entries from the database on the server, thereby enabling less-capable terminals (such as PDAs, cell phones, and other communicating devices, such as the RIM Blackberry) to work efficiently. In the preferred embodiment, the user can interact with the displayed information such that a single click will generate a context-populated communication session. This aspect of the invention greatly increases user efficiency and eliminates or greatly reduces drudgery in reading communication logs.

In a second embodiment, the invention provides for generating entries for a scheduling program. Information from a communication between two or more parties is parsed to determine whether the communication involves a scheduling event. If a scheduling event is detected, a proposed entry for the scheduling program including information derived from the communication is generated.

This aspect of the invention increases user productivity and eliminates or greatly reduces inadvertent non-entry of events.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 3b through 3c illustrate an embodiment of the invention where call logs are formatted in a calendar arrangement;

FIG. 6 illustrates a block diagram of an embodiment of the Calendar-centric Information Organizer which creates calendar scheduling entries from incoming communications;

FIGS. 7, 8 and 9 illustrate examples of how the communication-related information can stored in a calendar format;

DETAILED DESCRIPTION OF THE INVENTION

The present invention is best understood in relation to FIGS. 1-10 of the drawings, like numerals being used for like elements of the various drawings.

Figure 1:
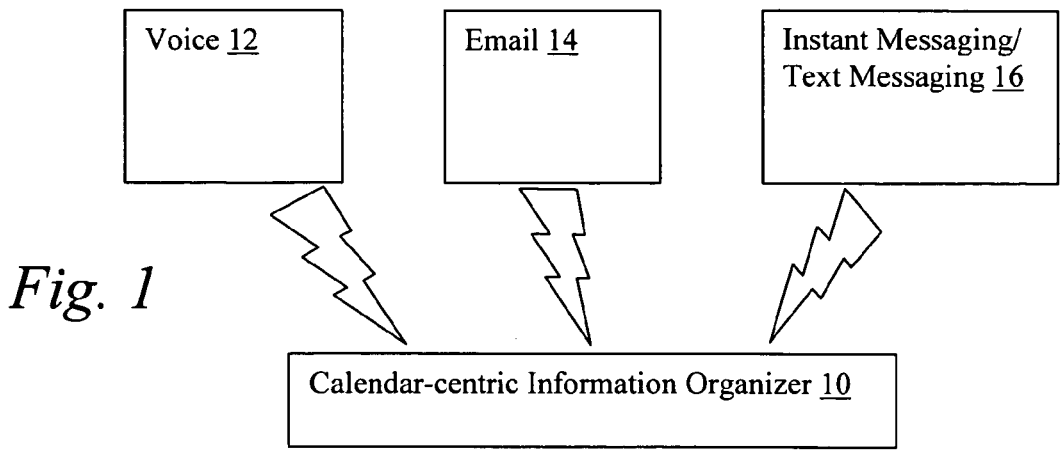
FIG. 1 illustrates a basic block diagram of a Calendar-centric Information Organizer communicating with various sources of communication.

FIG. 1 illustrates a basic block diagram of the present invention. A Calendar-centric Information Organizer 10 communicates with various sources of communication—voice sources 12, such as VOIP (voice over internet protocol) communications, email sources 14, and instant messaging/text messaging sources 16. Information regarding communications with the sources, and any other communication source that can be tracked, is organized in calendar form by the Calendar-centric Information Organizer 10 in a calendar format, shown in greater detail hereinbelow.

In operation, the Calendar-centric Information Organizer 10 is a program which can be executed on a processing device, such as a desktop computer, mobile computer, personal digital assistant (PDA), mobile phone, smart phone, and so on. The various communication sources 12-16 are monitored by the Calendar-centric Information Organizer 10, which organizes information regarding communications on the sources 12-16. The ways in which this information is organized depends on the type and content of the information.

Figure 2:
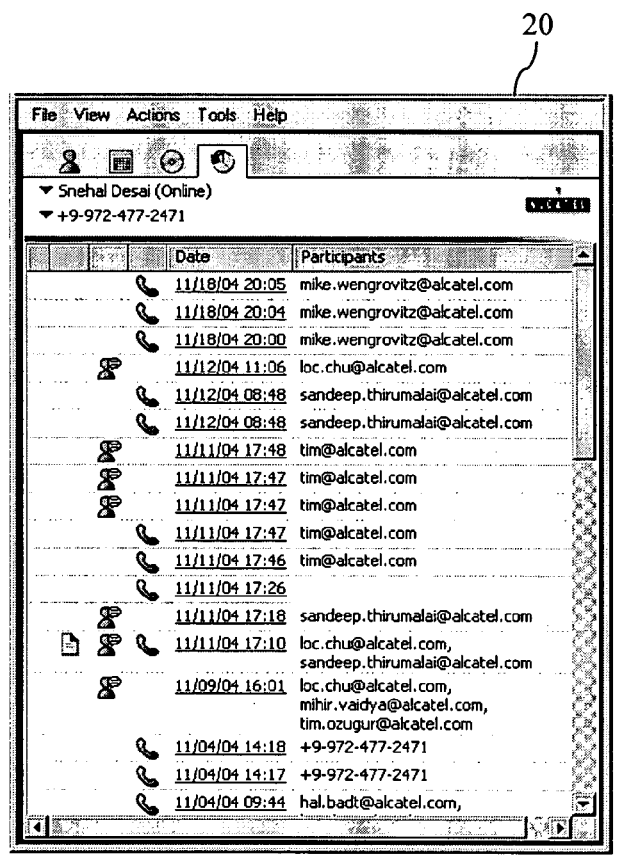
FIG. 2 illustrates a typical prior art message log.

FIG. 2 illustrates a typical prior art message log 20. In the illustrated embodiment, the message log 20 is a unified log showing communication from multiple sources, such as telephone calls, instant/text messages and email messages (a single communication could involve multiple sources, such as a communication involving both voice and instant messaging). For each message, a date and time are shown, along with the parties to the communication. Typically, the list of communications can be sorted on multiple fields, such as date/time or participants. The log 20 could also provide information on whether the attempted communication was completed or not, and identify the party that initiated the communication (i.e., was the user the calling party or the called party for a phone communication). Also, the log might include a subject line (entered by the calling party) which describes the purpose of the communication.

Although the log 20 provides information on certain aspects of a communication as described above, it is difficult to extrapolate additional information that is not explicitly provided in the log 20. For example, a customer may call every Thursday between 10 AM and 11 AM. The user may find this information important, so that he can be near his desk when the call is made. Call pattern information is almost impossible to derive from the list shown in FIG. 2, however.

Figure 3A:
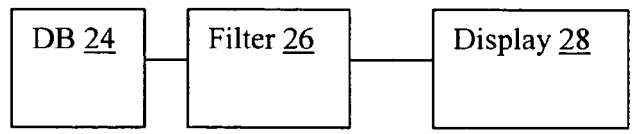
FIG. 3a illustrates a block diagram of a Calendar-centric Information Organizer.

FIGS. 3*a* through 3*c* illustrate an embodiment of the invention where call logs are formatted in a calendar arrangement. In this embodiment, information regarding various communications is organized in a familiar calendar format (or multiple formats) with the addition of filtering (in this case, a "buddy list").

FIG. 3*a* illustrates a basic block diagram of this embodiment. A database 24 stores information on communications between users. Filter software 26 is defined by the user to select all or a portion of the communications between the user and other parties from the information in database 24. Display software 28 generates a display (see FIGS. 3*b* and 3*c*, below) which displays the filtered data in a calendar format.

In operation, the database 24 is typically stored in a server somewhere on a network (not shown) to which the Calendar-centric Information Organizer 10 is in communication. Typically, the Calendar-centric Information Organizer 10 communicates with the database 24 over the Internet, or other publicly available network; however, the database 24 could be stored on a private network or on the user's processing device.

In FIG. 3*b*, a blank monthly calendar is shown, with the user selecting "Jason" from a list of buddies. Beyond selecting a specific party to a communication, the user can select the type of communication—i.e., all communications, voice calls only, instant messages only, missed voice calls, email messages only, and so on.

In FIG. 3*c*, information is displayed for missed calls from Jason. The subject line of the missed calls is shown in the box for the date on which the communication, or attempted communication, occurred.

Figure 4:
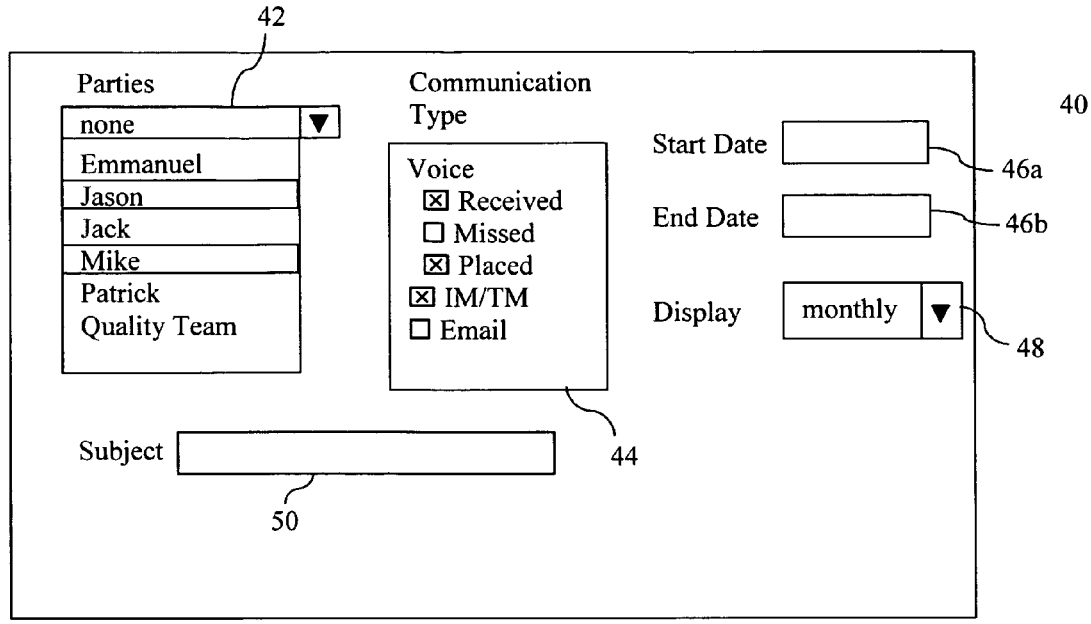
FIG. 4 illustrates a filter screen for specifying filtering criteria to be applied to the communication information for display in a calendar format.

FIG. 4 illustrates an alternative filter screen 40 for specifying filtering criteria to be applied to the communication information for display in a calendar format. A "Parties" drop-down box 42 provides a list of parties with which the user has had communications, or attempted communications (alternatively, the drop-down box could have a subset or subsets of this information, such as personal contacts, work contacts, medical, and so on). The parties may include groups, such as "Quality Team", that could include multiple related individuals. The user may select one or more parties from the drop-down box 42.

A Communication Type box 44 allows the user to select the types of communications that are to be displayed. The communication types listed in FIG. 4 include received voice communications, missed voice communications, placed voice communications, instant/text messages and email. Additional communication types could be added to box 44 as appropriate—such as video messages and so on.

Start and End date fields 46*a* and 46*b* allow the user to specify a date range for the communications. Display drop-down box 48 allows the user to specify the format of the display: daily, weekly, monthly, yearly and so on. Subject field 50 allows the user to specify keywords from the subject line of a communication.

The embodiment of the invention provided above provides a more structured view of prior communications which enables the user to derive non-explicit information from viewing the information in a calendar output form. This embodiment could be a stand-alone program, or incorporated with other scheduling programs with a calendar format, such as MICROSOFT OUTLOOK. By filtering the information from the database 24 at the server, rather at the user device, only the information related to the desired communication log entries is communicated from the server to the user device, enabling all types of terminals (including less capable terminals) to run the application efficiently. This is also a critical advantage for the database server, because it frees the server from sending huge downloads when only a specific subset is desired. Additionally, having prior communication sessions organized in a calendar view allows the user to easily plan future communication sessions vis-à-vis his or her own schedule.

Figure 5:
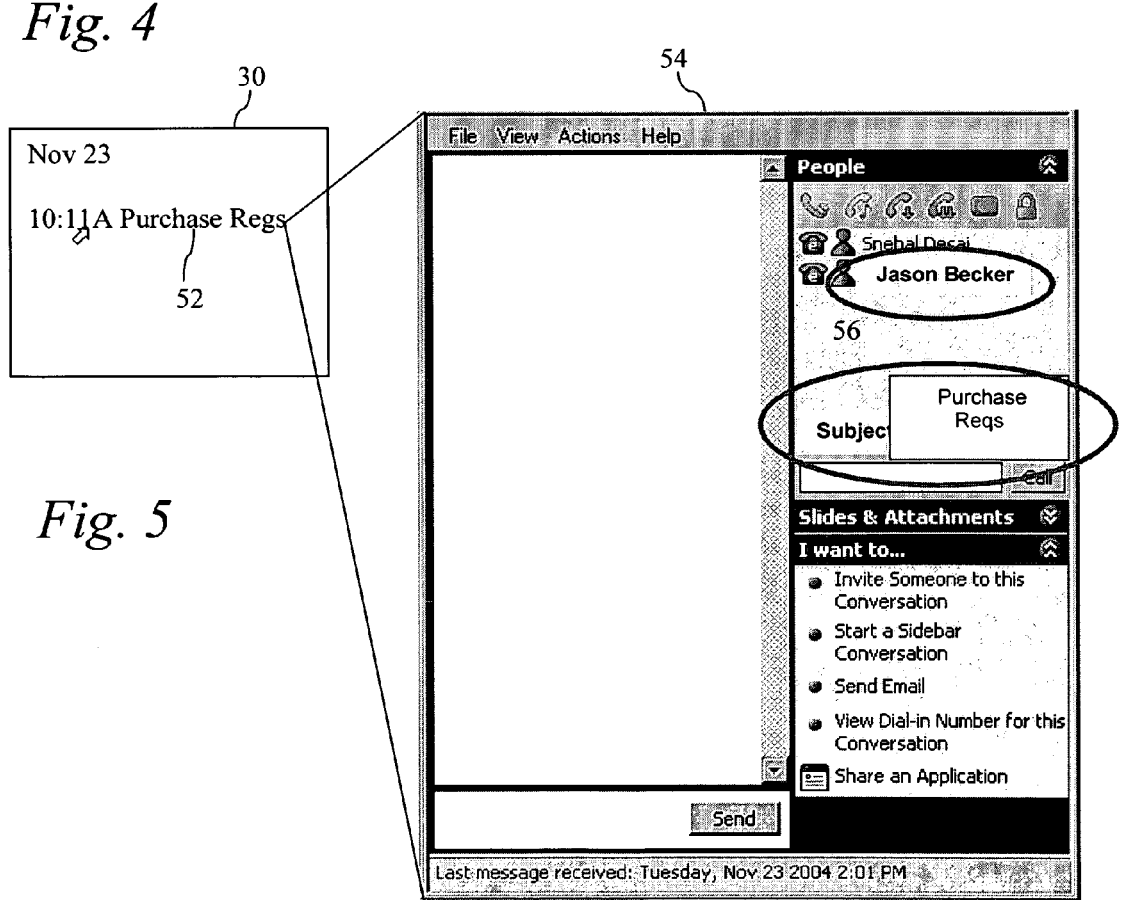
FIG. 5 illustrates an embodiment of the present invention where a user interaction with an entry in the calendar display initiates a new communication session.

FIG. 5 illustrates an embodiment of the present invention where a user interaction with an entry 52 in the calendar display 30 can initiate a new communication session. In FIG. 5, the user interacts with the entry "10:11 A Purchase Reqs", for example by double-clicking or right-clicking the entry using a graphical user interface. The action by the user invokes a communication screen 54, which takes the subject matter information (Purchase Reqs) from the entry 52 and automatically fills in the subject line of the new communication in field 54 (i.e., the communication session is context populated). The type of communication session initiated by the Calendar-centric Information Organizer 10 defaults to the type of communication session associated with the entry with which the user interacted. For the present example, the "Purchase Reqs" entry was a phone call, so the Calendar-centric Information Organizer would initiate a phone call in response to an appropriate action by the user. However, the type of communication session could be easily changed by the user. Further, the party associated with the entry 52 (Jason Becker) is selected as a party to the new communication. The remainder of the communication session can be completed by adding attachments and specifying additional parties, if desired.

This aspect of the invention provides an efficient method of initiating communication sessions based on prior communication sessions. In most cases, a single click on the calendar entry can generate the context-populated response communication session. User productivity is increased by minimizing user-interaction time and by eliminating or greatly reducing drudgery in reading communication logs.

FIG. 6 illustrates an embodiment of the Calendar-centric Information Organizer which creates calendar scheduling entries from incoming communications. An incoming communication 60 is parsed by parser 62 to determine whether it contains information that can be used to create a scheduling entry. If so, a scheduling entry is placed in the database 64 containing calendar entries (or To-do list entries, as appropriate).

In operation, the incoming communication could be a voice/video communication including a subject line, and instant/text message, or an email message. For an instant/text message or an email message, the parser could look at the entire message to determine whether it refers to an event that should be scheduled, while the subject line would be parsed for a voice communication. It would also be possible to use voice recognition techniques to create text from an ongoing voice communication, which could then be scanned for events for scheduling.

In particular, the parser would retrieve text from a communication as appropriate and look for key words such as "meet", "meeting", "mtg", "conference", "telephone conference", "lunch", "dinner", "game", and other words commonly used to refer an event that should be scheduled, and then determine whether words surrounding the key words provide enough information to schedule, or reasonably schedule, an event. For example, the text string "I'll meet you at the bus stop" would typically not meet the threshold for automatically scheduling an event, while "I'll meet you at the bus stop at 3 PM tomorrow" would be sufficient.

Figure 8:
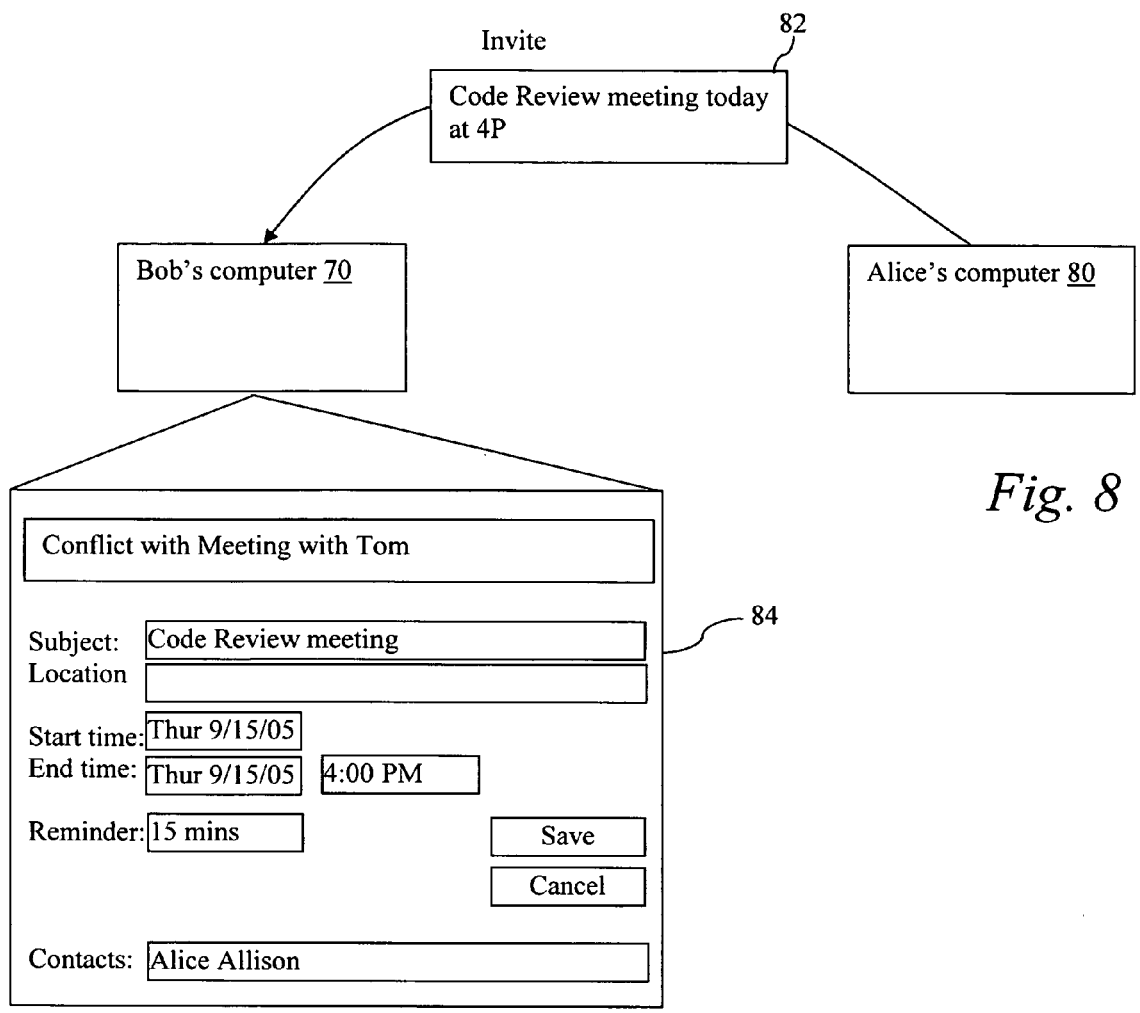
Figure 9:
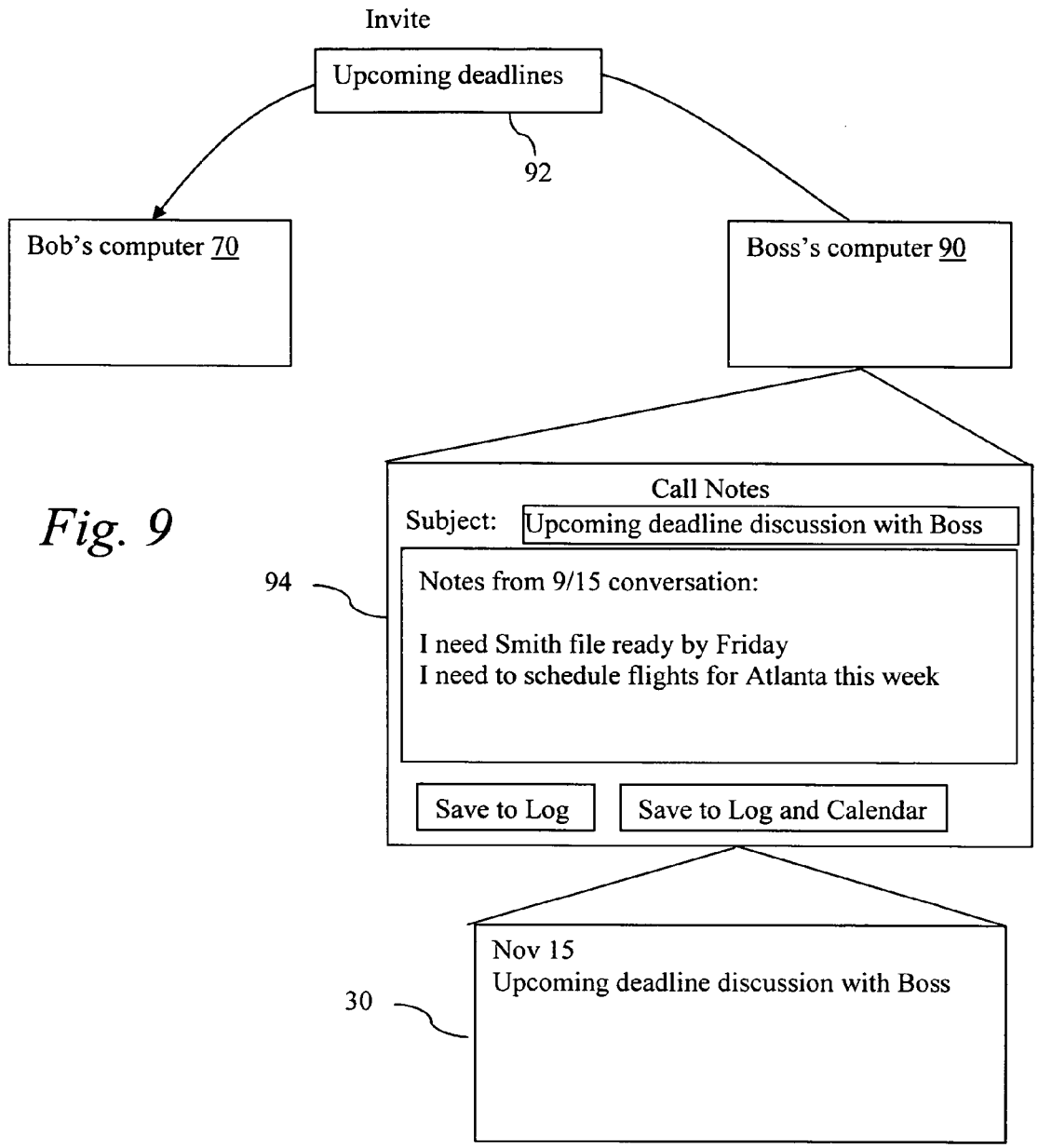

FIGS. 7, 8 and 9 illustrate examples of how the communication-related information can stored in a calendar format. In FIG. 7, a communication between Bob and Tom is initiated by Bob's computer 70 sending Tom's computer 72 an invite message 74 with the subject line "Meeting today at 4 P". The parser 62 interprets the subject line as indicative of a calendar event and automatically generates an entry 76 for the calendar program in Tom's computer, entitled "Meeting with Bob". Tom can accept the entry, modify the entry as appropriate, or cancel the entry. It should be noted that Bob's computer can also automatically generate an entry based on the outgoing subject line.

In FIG. 8, a communication between Alice and Bob is initiated by Alice's computer 80 sending Bob's computer 70 an invite message 82 with the subject line "Code Review Meeting today at 4 P". The parser 62 interprets the subject line as indicative of a calendar event and automatically generates an entry 84 for the calendar program in Bob's computer. Because this entry is in conflict with the previous appointment, a warning 86 is generated on the screen, indicating that the current entry will conflict with "Meeting with Tom". As before, Tom can accept the entry, modify the entry or cancel the entry.

While the example shown in FIGS. 7 and 8 use a voice communication to generate a calendar entry, the same could be accomplished using email or instant/text messaging.

In FIG. 9, Bob receives a call from his boss's computer 90 regarding deadlines for the project, initiated by invite message 92. Since this call is important for Bob, he takes notes during the call (in a program 94 associated with the call log) and would like the notes to be added not only to the call log, but also to his calendar program. Since Bob views his calendar more often than the call log, the call information (caller, date, time, call subject) and call notes if saved in the calendar may serve as handy reminder for Bob. The call notes program allows Bob to select whether to save the notes to the call log or to both the call log and calendar. If Bob selects to save the notes to both the log and the calendar, it will show up as a calendar entry in the calendar display 30 on the date the notes were taken.

Figure 10:
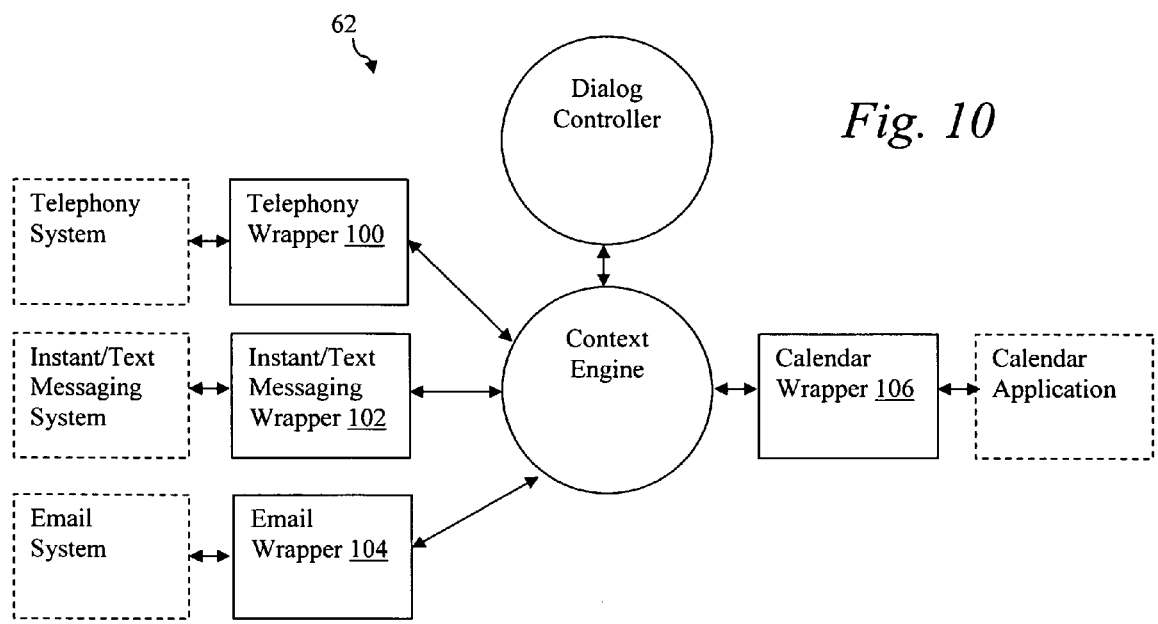
FIG. 10 illustrates a preferred embodiment for implementing the parser of FIG. 6.

FIG. 10 illustrates a preferred embodiment for implementing the parser 62. The parser 62 receives information from the various communication programs. Because information in the various communication programs will be in different forms depending upon the application program being used, telephony wrappers 100, 102, 104 and 106 translate between the parser 62 and the various application programs. Thus, telephony wrapper 100 will translate information from the telephony system to a form suitable for processing by the parser 62 and will translate information from the parser 62 into a form usable by the telephony system. Similarly, instant/text messaging wrapper 102 will translate information from the instant/text messaging system to a form suitable for processing by the parser 62 and will translate information from the parser 62 into a form usable by the instant/text messaging system. The email wrapper 104 translates information from the email system to a form suitable for processing by the parser 62 and will translate information from the parser 62 into a form usable by the email system. The calendar wrapper 106 translates information from the calendar system to a form suitable for processing by the parser 62 and will translate information from the parser 62 into a form usable by the calendar system.

A context engine 108 is coupled to the various wrappers 100-108 and to a dialog controller 110. The context engine maintains the current context of communications by the user. The context engine 108 is the core of the architecture. The context engine 108 subscribes with the various communication systems for events such as incoming call/messages/email and outgoing call/messages/email. When the context engine 108 is notified of an incoming voice call event, it queries the telephone system for the subject of the call. The context engine 108 saves the call log in the calendar with subject, time of call, any notes, and so on. It also passes the subject to the dialog controller 110 for further processing. Based on the parsed result from the dialog controller 110, the context engine 108 may decide to create a new event in the calendar, as described above. If the calendar application already has an event that conflicts with the event proposed by the context engine, the calendar application notifies the context engine 108 of the conflict and the context engine 108 passes this information to the user.

The dialog controller 110 parses the subjects of email, instant/text messages and phone calls. The dialog controller 110 determines potential calendar event types (e.g. meeting), event time and date from the subject and passes this information to the context engine. The date can be explicit (e.g., "September 15") or implicit (e.g., "next Monday"). Some communication information may not indicate that scheduling event is necessary. In this case, the dialog controller 110 informs the context engine 108 that this subject is not relevant to scheduling.

It should be noted that the various applications, telephony, email, instant/text messaging, and so on, could be third party programs, or integrated with the parser.

The present invention provides significant advantages over the prior art. First, it organizes data regarding communications in a familiar, easily accessed form. Second, it can automatically generate calendar (and to-do) events, which reduces user effort, and can prevent inadvertent non-entry of important events.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method of generating entries for a scheduling program on a processing device, comprising the steps of:
   parsing text from a communication received by the processing device, wherein the communication includes a voice communication received by the processing device;
   determining whether the communication relates to an event by using voice recognition to create text from the voice communication and analyzing the text for key words commonly used to refer to an event;
   when the text includes the key words, determining whether the text provides information needed to create an entry for the event;
   responsive to determining information needed to create an entry for a scheduling event, automatically creating an entry for the scheduling program including information derived from the text of the voice communication.

2. The method of claim 1 wherein the step of automatically creating an entry for the scheduling program includes the step of automatically creating a calendar entry that may be accepted, modified and canceled.

3. The method of claim 1 wherein the step of automatically creating a proposed entry for the scheduling program includes the step of automatically creating a to-do list entry.

4. The method of claim 1 wherein said parsing step includes the step of interfacing with a telephony system to translate information from the voice communication into a predetermined format.

5. Processing device for generating entries for a scheduling program, comprising:
   apparatus for parsing text from a communication received by the processing device, wherein the communication includes a text message;
   apparatus for determining whether the text includes key words indicating that the communication relates to a scheduling event;
   apparatus for when the text includes key words indicating that the communication relates to a scheduling event, determining whether the text provides information needed to create an entry for the scheduling event; and
   apparatus for automatically creating an entry for the scheduling program including information derived from the text of the communication responsive to determining information needed to create an entry for the scheduling event.

6. The processing device of claim 5 wherein apparatus for automatically creating an entry for the scheduling program includes apparatus for automatically creating a calendar entry that may be accepted, modified and canceled.

7. The processing device of claim 5 wherein apparatus for automatically creating an entry for the scheduling program includes apparatus for automatically creating a to-do list entry.

8. The processing device of claim 5 wherein said parsing apparatus includes apparatus for interfacing with a text messaging system to translate information from the text message into a predetermined format.

9. The processing device of claim 8 wherein apparatus for automatically creating an entry for the scheduling program including information derived from the text of the communication responsive to determining information needed to create an entry for a scheduling event, includes:
   apparatus for determining whether words surrounding the key words provide enough information to create an entry for the scheduling event.

10. The processing device of claim 9, wherein the said parsing apparatus receives text from the communication and looks for key words commonly used to refer to an event.

11. A method of generating entries for a calendar-centric information organizer on a processing device, comprising the steps of:
    receiving a plurality of communications by the processing device, wherein the plurality of communications include the following types of communications: voice communication, text message and email;
    converting each of the plurality of communications into a predetermined format;
    parsing text from each of the plurality of communications received by the processing device;
    determining whether the text from any of the plurality of communications relates to an event by analyzing the text of each of the plurality of communications for key words commonly used to refer to an event;
    when the text of one of the plurality of communications includes the key words, determining whether the text of the one of the plurality of communications provides information needed to create an entry for the event; and
    responsive to determining information needed to create an entry for a scheduling event, automatically creating an entry for the scheduling program including information derived from the text of the one of the plurality of communications.

12. The method of claim 11 wherein said converting step includes the steps of:
    interfacing with a telephony system to translate information from a voice communication into the predetermined format;
    interfacing with a text message to translate information from a text message into the predetermined format; and
    interfacing with an email system to translate information form an email into the predetermined format.

13. The method of claim 12, further comprising:
    displaying information by the processing device for each of the plurality of communications in a calendar format according to the date associated with each of the plurality of communications.

* * * * *